(12) United States Patent
Ullman et al.

(10) Patent No.: US 7,440,190 B2
(45) Date of Patent: Oct. 21, 2008

(54) DEVICE FOR RESHAPING A LASER BEAM

(75) Inventors: Alan Z. Ullman, Northridge, CA (US); Yan S. Tam, Oak Park, CA (US)

(73) Assignee: The Boeing Company, Irvine, CA (US)

( * ) Notice: Subject to any disclaimer, the term of this patent is extended or adjusted under 35 U.S.C. 154(b) by 0 days.

(21) Appl. No.: 11/549,724

(22) Filed: Oct. 16, 2006

(65) Prior Publication Data

US 2008/0088959 A1 Apr. 17, 2008

(51) Int. Cl.
*G02B 27/10* (2006.01)
*G02B 17/00* (2006.01)
*G03B 27/54* (2006.01)

(52) U.S. Cl. .......................... 359/629; 359/726; 355/67

(58) Field of Classification Search ................. 359/649, 359/626, 627, 629, 648, 726–731, 364–366; 355/67
See application file for complete search history.

(56) References Cited

U.S. PATENT DOCUMENTS

| 6,504,652 | B1 * | 1/2003 | Ichihashi et al. ............ 359/649 |
| 2004/0150807 | A1 * | 8/2004 | Botma et al. .................. 355/71 |
| 2004/0263986 | A1 * | 12/2004 | Brown ........................ 359/626 |
| 2005/0219495 | A1 * | 10/2005 | Singer et al. .................. 355/67 |

* cited by examiner

*Primary Examiner*—Alicia M Harrington
(74) *Attorney, Agent, or Firm*—Charles L. Moore; Moore & Van Allen, PLLC (57) ABSTRACT

A device for reshaping a laser beam may include a first optical element to receive the laser beam. The device may also include a second optical element to invert and reshape the laser beam to substantially correspond to a aperture of a beam director.

32 Claims, 4 Drawing Sheets

DEVICE FOR RESHAPING A LASER BEAM

BACKGROUND OF THE INVENTION

The present invention relates to optics and laser beam shaping and more particularly to a device for reshaping a laser beam to correspond to an aperture of a beam director or other optical device.

Most solid state and some chemical lasers produce laser beams that are substantially square or rectangular, and do not have a central region which is un-illuminated (e.g., central obscuration.) Such laser beams may be directed onto targets at a great distance using a beam director or similar optical device. Beam directors typically include a moveable spherical telescope with an output aperture that is circular with a circular central obscuration through which the laser beam may not be projected. Accordingly, the most desirable shape for a laser beam to be projected from such a beam director is a "donut" (annulus) shape with the same ratio of inner and outer diameters that corresponds to the usable output aperture of the beam director. With this beam configuration, the entire laser beam can be placed onto, and substantially entirely fill, the usable output aperture of the beam director. If the laser beam, after suitable geometric scaling with telescopes both internal and external to the beam director, projects outside of the beam director aperture or within the central obscuration, the beam should be trimmed or "clipped" on the outside and "cored" inside the periphery of the beam. Typically this is performed using mirrors that reflect the unwanted portion of the laser beam out of the propagation path of the laser beam, for example into a beam dump. The beam power to be projected by the beam director is thereby reduced. Similarly, if the laser beam does not completely fill the aperture of the beam director the beam will not be focused as effectively, reducing the intensity or brightness of the focused laser beam at the target. In either event the intensity of the laser beam at the target is diminished.

BRIEF SUMMARY OF THE INVENTION

In accordance with an embodiment of the present invention, a device for reshaping a laser beam may include a first optical element to receive the laser beam. The device may also include a second optical element to invert and reshape the laser beam to substantially correspond to an aperture of a beam director.

In accordance with another embodiment of the present invention, a device for reshaping a laser beam may include a first reflector element to reflect the laser beam in a circular pattern from the first reflector and a second reflector element to reflect the circular pattern laser beam from the first reflector element. The device may also include a third reflector element to reflect the circular pattern laser beam from the second reflector element and a fourth reflector element to reflect and reshape the circular pattern laser beam with a central portion corresponding substantially to a central obscuration of an aperture of a beam director.

In accordance with another embodiment of the present invention, a system for reshaping a laser beam may include a laser source to generate the laser beam. The system may also include a beam director to project a reshaped laser beam on a target. The system may further include an optical device to invert and reshape the laser beam to substantially correspond to an aperture of the beam director.

In accordance with another embodiment of the present invention, a system for reshaping a laser beam may include a laser source to generate the laser beam. The laser beam may be a substantially square or rectangular laser beam with an illuminated central portion. The system may also include a first axicon configured to reshape the laser beam into a substantially circular laser beam and a second axicon configured to substantially remove any illumination in a predetermined central portion of the circular laser beam and to compact the laser beam to substantially correspond to a form geometrically similar to the useful aperture of a beam director. The system may further include a beam director to project the reshaped laser beam on a target.

In accordance with another embodiment of the present invention, a method for reshaping a laser beam may include inverting a substantially square or rectangular laser beam with an illuminated central portion into a substantially circular laser beam. The method may also include substantially removing any illumination in a predetermined central portion of the circular laser beam.

In accordance with another embodiment of the present invention, a method of making a device for reshaping a laser beam may include forming a first axicon configured to reshape a laser beam with an illuminated central portion into a substantially circular laser beam. The method may also include forming a second axicon configured to substantially remove any illumination in a predetermined central portion of the circular laser beam and to compact the laser beam to substantially correspond to a form geometrically similar to the useful aperture of a beam director or other optical device.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
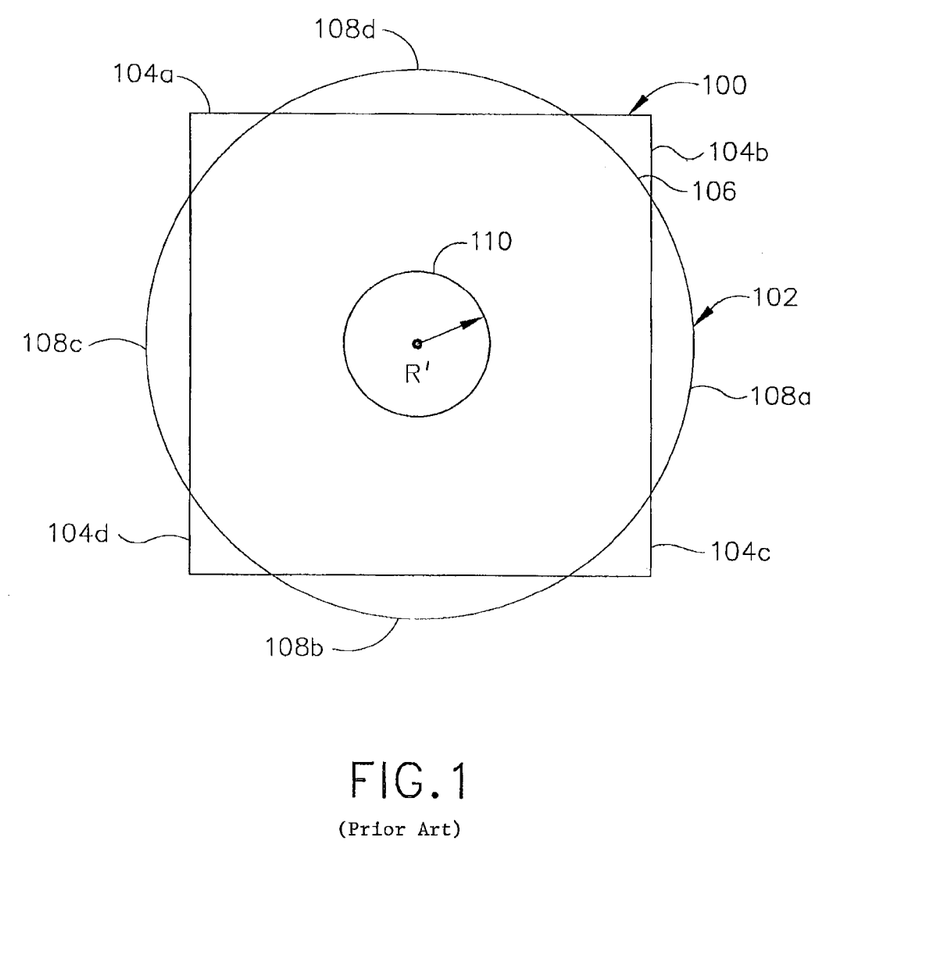
FIG. 1 is an illustration of a footprint of a non-circular or substantially square laser beam superimposed on an aperture of a beam director for projecting a laser beam on a target.

FIG. 1 is an illustration of a footprint of a non-circular or substantially square laser beam 100 superimposed on an aperture 102 of a beam director for projecting a laser beam on a target. Examples of a laser source that may generate a non-circular or substantially square laser beam, such as beam 100 may include a solid state laser source, a chemical laser or the like. As illustrate in FIG. 1, because the non-circular laser beam 100 does not correspond to the aperture 102 of the beam director, laser power is lost and portions of the aperture 102 of the beam director that could be used for projecting laser energy are not used. The corner portions 104 of the square laser beam 100 extend beyond a perimeter 106 of the aperture 102 and the power in these portions of the beam 100 are lost. Additionally, segments 108 of the aperture 102 are not illuminated or filed by the square laser beam 100 and therefore do not transmit or project any of the beam 100. Accordingly, these segments 108 are not used to project any laser energy on a target and the aperture 102 is being inefficiently utilized. Furthermore, the aperture 102 of the beam director includes a substantially circular central obscuration 110. Any laser illumination or energy corresponding to the obscuration 110 would also be lost. Depending on the application, the dimensional relationship between the non-circular laser beam 100 and the aperture 102 may be adjusted such that there is a greater or lesser amount of laser power beyond the aperture 102, and correspondingly lesser or greater portions of the aperture 102 remain unilluminated by the laser beam 100.

The present invention makes maximum utilization of a non-circular laser beam and the aperture configuration of a beam director by providing a device for reshaping a non-circular laser beam, such as a substantially square or rectangular laser beam, or a multiplicity of laser beams configured in a non-circular arrangement. The device of the present invention reshapes the non-circular laser beam to substantially correspond to the aperture 102 of the beam director to direct substantially maximum power and intensity of the original laser beam or beams on a target.

Figure 2:
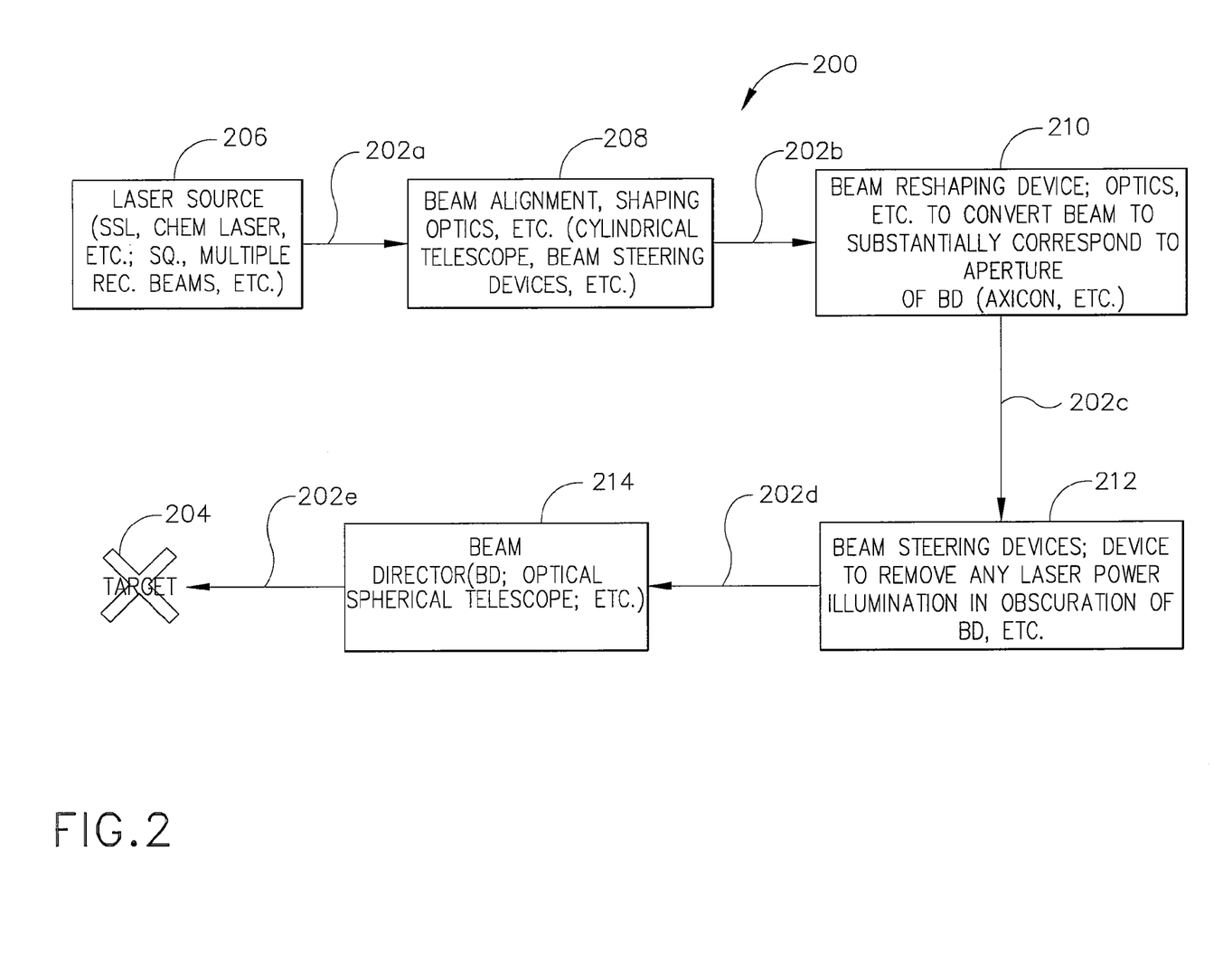
FIG. 2 is a block diagram of a system for projecting a laser beam on a target in accordance with an embodiment of the present invention.

FIG. 2 is a block diagram of a system 200 for projecting a laser beam 202 on a target 204 in accordance with an embodiment of the present invention. The system 200 may include a laser source 206 for generating laser beam 202a or the like. The laser beam 202a may be a high energy laser beam. The power of such a high energy laser beam may be in excess of about 1 kilowatt (kW), more desirably in the range of about 100 kW to above 1 Megawatt (MW). The laser power may be continuous wave (CW) or may be in a pulsed format, with pulse frequencies ranging from about 10 Hertz (Hz) up to beyond 1 Megahertz (MHz) depending on the nature of the laser. For pulsed lasers, the percentage of time on may typically be as high as about 20 percent and can be as low as a fraction of 1 percent. Examples of laser sources 206 for generating high energy laser beams may include solid state lasers, chemical lasers or similar laser sources. Such high energy laser sources typically generate laser beams with non-circular footprints or laser cross-sections, e.g., a substantially square or rectangular footprint. Other laser sources or high energy laser sources that may be used may generate multiple beams (a phased array) that may each be substantially square or rectangular and which may be arranged in a non-circular pattern for propagation.

An optical device 208, which may include beam alignment optics, beam shaping optics and other optical elements may receive the laser beam or beams 202a from the laser source 206 to produce a compact, substantially square beam 202b. If the laser beam 202a is a substantially rectangular beam, the optical device 208 or devices may include a cylindrical telescope with magnification to convert the rectangular beam 202a into a substantially square or nearly square footprint. If the laser beam 202a is a multiplicity of beams, the optical device 208 may also include optical elements to combine the beams into a compact shape with minimal un-illuminated areas. For example, eight beams can be arranged in a rectangle, while seven beams may be configured into rows of 2:3:2 beams in a symmetric way such as to approximate a hexagon. As appropriate, the compacted grouping of beams may also be passed through a cylindrical telescope so as to produce a relatively symmetric shape (e.g., one having approximately equal height and width.) This array of beams may then be processed as described herein for a single substantially square beam.

The optical devices 208 may also include beam steering mirrors or the like to direct the resulting beam 202b into a beam reshaping device 210. The beam reshaping device 210 may include beam reshaping optics to convert the beam to a footprint or cross-section that substantially corresponds to an aperture of a beam director 214. An example of a device for reshaping a laser beam that may be used for the reshaping device 210 will be described in more detail with reference to FIGS. 3 and 4. The beam reshaping device 210 may include at least one axicon to invert and reshape the laser beam to substantially correspond to the aperture geometry of the beam director 214, similar to the beam director aperture 102 illustrated in FIG. 1.

The system 200 may also include other optical devices 212 to receive the reshaped beam 202c from the beam reshaping device 210. The other optical device or devices 212 may include beam steering elements to direct the beam 202d in the aperture of the beam director 214. The other optical device or devices 212 may also include a coring element or optics to remove any laser power illumination in an obscuration (similar to obscuration 110 in FIG. 1) of the beam director 214. The footprint or cross-section of the beam 202c resulting from the beam reshaping device 210 may include a central portion corresponding to the beam director obscuration that is has a runcible or scalloped shape caused by inverting the substantially square laser beam. These illuminated scallops can be removed with minimal loss of power or brightness of the resulting laser beam 202d. The optical devices 212 may include an aperture, filter or other optics to core or remove the scalloped central portion of the beam 202c so that the resulting beam 202d corresponds substantially to the aperture of the beam director 214 to substantially uniformly fill the aperture with minimal loss of power and intensity of the original beam 202a.

The beam director 214 may include optical elements that include a movable spherical telescope with an output aperture that is circular with the circular central obscuration as previously described. The beam director 214 may also include optical elements to direct the laser beam onto the optical elements that comprise the movable spherical telescope. The laser beam 202e may be projected by the beam director 214 on the target 204.

Figure 3:
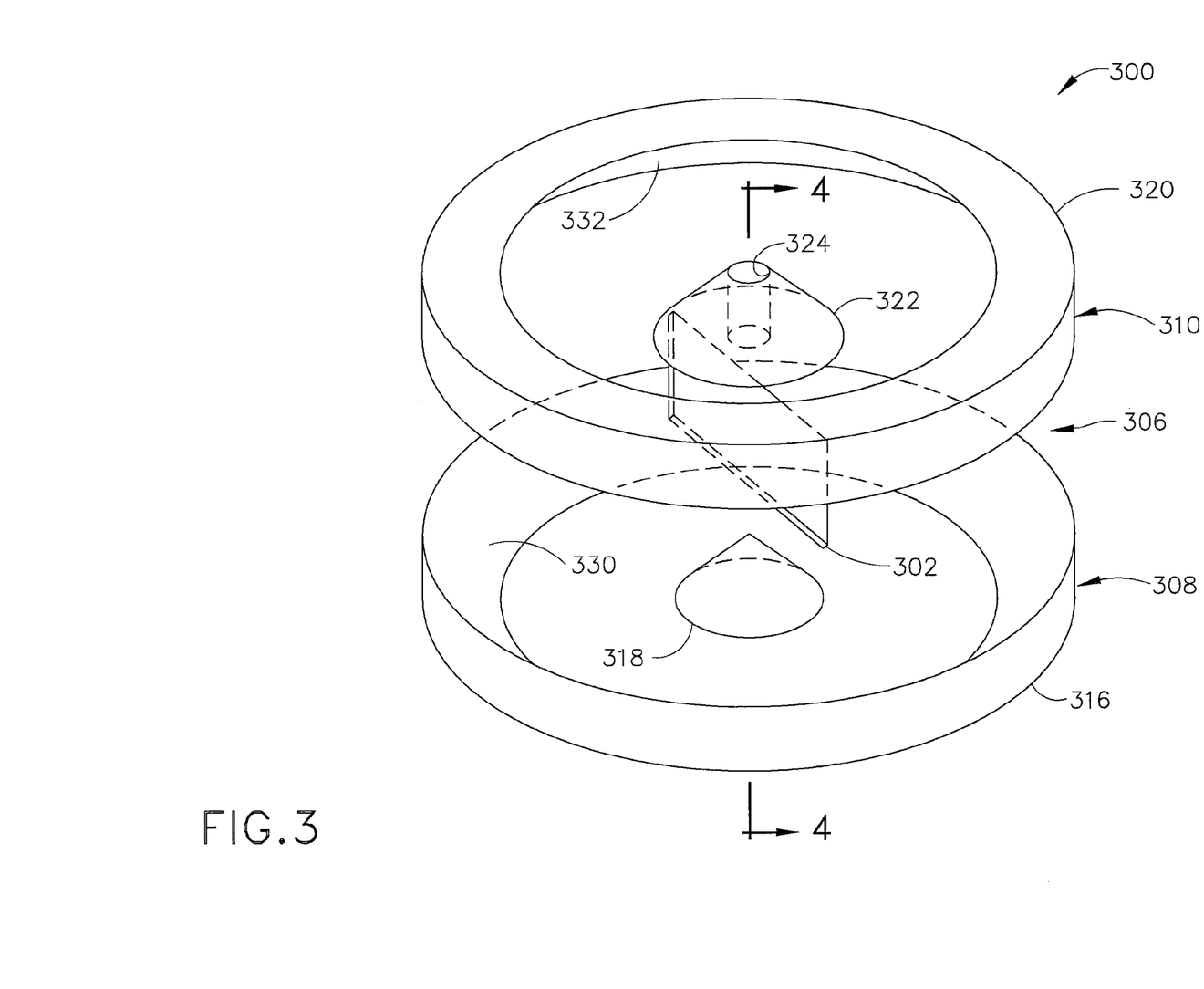
FIG. 3 is a perspective view of an optical device to convert a non-circular laser beam to a shape that substantially corresponds to an aperture of a beam director in accordance with an embodiment of the present invention.
Figure 4:
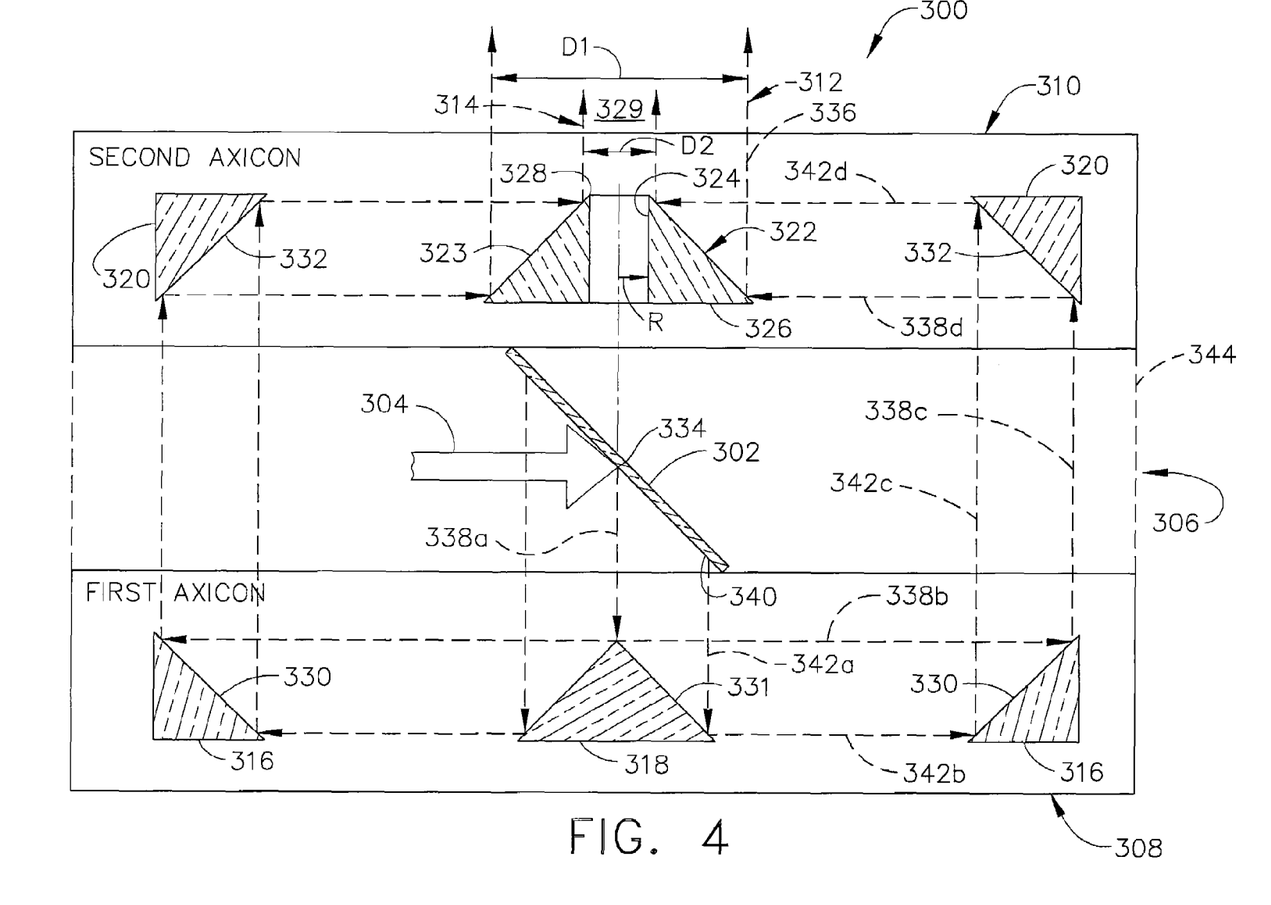
FIG. 4 is a cross-sectional view of the optical device of FIG. 3 taken across lines 4-4 in accordance with an embodiment of the present invention.

FIG. 3 is a perspective view of an optical device 300 to convert a non-circular laser beam to a shape that is substantially geometrically similar to an aperture of a beam director, similar to aperture 102 of FIG. 1, in accordance with an embodiment of the present invention. The optical device 300 may be used for the beam reshaping device 210 in the system 200 of FIG. 2. Referring also to FIG. 4, FIG. 4 is a cross-sectional view of the optical device 300 of FIG. 3 taken across lines 4-4. The optical device 300 may include a first optical element 302 to receive and redirect a laser beam 304 as best shown in FIG. 4. The first optical element 302 may be a reflector or a mirror. The optical device 300 may also include a second optical element 306 that may be defined by a first axicon 308 and a second axicon 310 or other optical elements that accomplish substantially the same results. The second optical element 306 may invert and reshape the laser beam 304 so that it is substantially geometrically similar to an aperture of a beam director, similar to beam director aperture 102 illustrated in FIG. 1. The second optical element 306 may be adapted to invert and reshape the laser beam 304 while maintaining substantially a maximum power and intensity of the original laser beam. In other words, the second optical element 306 may be adapted to invert and reshape the laser beam to provide substantially a minimal loss of power caused by the inverted and reshaped laser beam extending beyond the aperture of the beam director and to provide an optimum intensity at a target on which the inverted and reshaped laser beam 312 may be projected.

As described herein, the device 300 or second optical element 306 may include an axicon or a first axicon 308 and a second axicon 310 configured to invert the laser beam 304 and then resize the beam to provide a resultant beam 312 with a ratio of an outer beam diameter D1 to that of an un-illuminated central portion diameter D2 (FIG. 4) of the resultant beam 312 being about equal to or slightly greater than the aperture of the beam director. The first axicon 308 may be configured to invert a substantially square or rectangular laser beam with an illuminated central portion into a substantially circular laser beam with a central obscuration geometrically much greater than that of the usable aperture of the beam director. The second axicon 310 may be configured so that the beam from the first axicon 308 is not inverted and such that the resulting circular laser beam 312 has no illumination in a predetermined central portion 314 of the beam such that the central obscuration is geometrically equal to or slightly smaller than that of the usable aperture of the beam director.

The first axicon 308 may include a first axicon annular reflector 316 or mirror and a first axicon substantially cone-shaped reflector 318 or mirror disposed within the annular reflector 316 to reflect the laser beam 304 to the first axicon annular reflector 316 as illustrated in FIG. 4. As is apparent from FIGS. 3 and 4, the first axicon substantially cone-shaped reflector 318 will reflect the incident laser beam 304 in a circular pattern from the cone-shaped reflector 318. The annular reflector 316 and the cone-shaped reflector 318 are arranged such that the laser beam 304 when projected onto first the cone-shaped reflector 318 and then onto the annular reflector 316 produces an outgoing beam that propagates in a substantially parallel direction to the laser beam 304. This requires that the orientation of a reflective surface 330 of the annular reflector 316 to be oriented at a complementary angle to a reflective surface 331 of the cone-shaped reflector 318. This may be conveniently achieved by arranging the reflective surface 330 of the annular reflector 316 to be oriented at 45° to the propagation direction of the laser beam 304 and the reflective surface 331 of the cone-shaped reflector 318 to be oriented perpendicular to the reflective surface 330 of the annular reflector 316.

The second axicon 310 may include a second axicon annular reflector 320 or mirror to reflect the laser beam 304 from the first axicon annular reflector 316 to a second axicon substantially cone-shaped reflector 322 or mirror disposed within the second axicon annular reflector 320. The second axicon substantially cone-shaped reflector 322 may include a central cylindrical opening 324. The central cylindrical opening may extend between a base 326 and a top portion 328 or apex of the second axicon cone-shaped reflector 322 as shown in FIG. 4. The central cylindrical opening 324 may have a predetermined radius R that may correspond substantially to a radius R' (FIG. 1) of a central obscuration of the beam director, such as obscuration 110 in FIG. 1. The central cylindrical opening 324 creates an un-illuminated portion 329 in the inverted and reshaped laser beam 312 that corresponds substantially to the shape of the obscuration of the beam director. In accordance with the description of the first axicon 308, a reflective surface 323 of the substantially cone-shaped reflector 322 is oriented at 45° to the propagation direction of the laser beam 304, and a reflective surface 332 of the second axicon annular reflector 320 is oriented perpendicular to reflective surface 323 of the substantially cone-shaped reflector 322. In that way the incoming laser beam from optical element 302 and the outgoing laser beam 312 are parallel but propagate in opposite directions.

The first and second axicon annular reflectors 316 and 320 may each have a right triangular cross-section, as illustrated in FIG. 4, and reflective surfaces 330 and 332 or mirrors, respectively, defined by a hypotenuse of the right triangular cross-section. As is apparent from FIG. 4, the laser beam 304 is inverted by the annular reflectors 316 and 320 so that an interior portion 334 of the laser beam 304 becomes a exterior portion 336 of the inverted and reshaped laser beam 312, if the broken lines 338 are traced through the device 300 in FIG. 4. Similarly, an exterior portion 340 of the laser beam 304 is inverted and defines the interior or central portion 314 of the inverted and reshaped beam 312 if the broken lines 342 are traced through the device 300 in FIG. 4. Thus, the inverted and reshaped beam 312 will have a substantially circular donut shaped footprint or cross-section geometrically similar to the aperture 102 of the beam director illustrated in FIG. 1.

The first and second axicons 308 and 310 may be retained in proper alignment relative to each other by a fixture, housing or other support structure 344. Where necessary support structure may be placed internal to the optical device 300 so as to assure adequate dimensional control internal and external to the first and second axions 308 and 310, respectively. This internal support structure may intercept some portion of the laser beam traversing between the first and second axicons 308 and 310. The support structure may include provisions to reflect or adsorb the intercepted portions of the laser beams.

The block diagrams in the Figures illustrate the architecture, functionality, and operation of possible implementations of systems and methods according to various embodiments of the present invention. In this regard, each block in the block diagrams may represent a module, component, element or segment. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems which perform the specified functions or acts, or combinations of special purpose hardware.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A device for reshaping a laser beam, comprising:
a first optical element to receive the laser beam; and
a second optical element to invert and reshape the laser beam to substantially correspond to an aperture of a beam director, wherein the laser beam is inverted and reshaped to have an un-illuminated central portion corresponding substantially to a central obscuration of the aperture of the beam director, the laser beam being inverted such that an interior portion of the laser beam becomes an exterior portion of the laser beam exiting the device and an exterior portion of the laser beam becomes an interior portion of the laser beam exiting the device and defines the un-illuminated central portion of the laser beam, and wherein the inverted and reshaped laser beam maintains substantially a maximum power and intensity of the original laser beam.

2. The device of claim 1, wherein the second optical element is adapted to invert and reshape the laser beam to provide substantially a minimal loss of power caused by the inverted and reshaped laser beam extending beyond the aperture of the beam director and to provide an optimum intensity at a target on which the inverted and reshaped laser beam is projected.

3. The device of claim 1, further comprising an axicon configured to invert the laser beam and then resize a resultant beam so that a ratio of an outer beam diameter to that of an un-illuminated central portion of the beam is about equal to or slightly greater tan the aperture of the beam director.

4. The device of claim 1, further comprising:
a first axicon configured to reshape a substantially square or rectangular laser beam with an illuminated central portion into a substantially circular laser beam; and
a second axicon configured to compact the incident beam from the first axicon and to substantially remove any illumination in a predetermined central portion of the circular laser beam, wherein the first optical element is positioned between the first axicon and the second axicon to direct the laser beam to the first axicon.

5. The device of claim 1, wherein the second optical element comprises:
a first reflector element to reflect the laser beam in a circular pattern from the first reflector;
a second reflector element to reflect the circular pattern laser beam from the first reflector element;
a third reflector element to reflect the circular pattern laser beam from the second reflector element; and
a fourth reflector element to reflect and reshape the circular pattern laser beam with a central portion corresponding substantially to the central obscuration of the aperture of the beam director.

6. The device of claim 1, wherein the first optical element and the second optical element are adapted to convert a square footprint of the laser beam to a circular footprint including a non-illuminated central portion.

7. The device of claim 1, wherein the first optical element and the second optical element are adapted to covert a plurality of laser beams to a single circular laser beam including a non-illuminated central portion.

8. A device for reshaping a laser beam, comprising:
a first optical element to receive the laser beam;
a second optical element to invert and reshape the laser beam to substantially correspond to an aperture of a beam director, wherein the second optical element comprises:
a first axicon configured to reshape a substantially square or rectangular laser beam with an illuminated central portion into a substantially circular laser beam; and
a second axicon configured to compact the incident beam from the first axicon and to substantially remove any illumination in a predetermined central portion of the circular laser beam, wherein the first axicon comprises:
a first axicon annular reflector, and a first axicon substantially cone-shaped reflector to reflect the laser beam to the first axicon annular reflector; and
wherein the second axicon comprises:
a second axicon substantially cone-shaped reflector including a central cylindrical opening; and
a second axicon annular reflector to reflect the laser beam from the first axicon annular reflector to the second axicon substantially cone-shaped reflector.

9. The device of claim 8, wherein the first axicon annular reflector and the second axicon annular reflector each comprise a right triangular cross-section configured at a complementary angle to each other and a reflective surface defined by a hypotenuse of the right triangular cross-section.

10. The device of claim 8, wherein the central cylindrical opening has a predetermined radius corresponding substantially to a radius of a central obscuration of the aperture of the beam director.

11. A device for reshaping a laser beam, comprising:
a first reflector element to reflect the laser beam in a circular pattern from the first reflector;
a second reflector element to reflect the circular pattern laser beam from the first reflector element;
a third reflector element to reflect the circular pattern laser beam from the second reflector element; and
a fourth reflector element to reflect and reshape the circular pattern laser beam with a central portion corresponding substantially to a central obscuration of an aperture of a beam director.

12. The device of claim 11, wherein the first reflector element comprises a substantially cone-shaped reflector and wherein the fourth reflector element comprises a substantially cone-shaped reflector including a central cylindrically shaped opening.

13. The device of claim 12, wherein the central cylindrically shaped opening comprises a predetermined radius corresponding substantially to a radius of the central obscuration of the aperture of the beam director.

14. The device of claim 11, wherein the second reflector element comprises an annular reflector including a reflective surface oriented to reflect the circular pattern laser beam from the first reflector element to the third reflector element.

15. The device of claim 14, wherein the third reflector element comprises an annular reflector including a reflective surface oriented to reflect the laser beam from the second reflector element to the fourth reflector element.

16. A system for reshaping a laser beam, comprising:
a laser source to generate the laser beam;
a beam director to project a reshaped laser beam on a target; and
an optical device to invert and reshape the laser beam to substantially correspond to an aperture of the beam director, wherein the laser beam is inverted and reshaped to have an un-illuminated central portion corresponding substantially to a central obscuration of the aperture of the beam director, the laser beam being inverted such that an interior portion of the laser beam becomes an exterior portion of the laser beam exiting the device and an exterior portion of the laser beam becomes an interior portion of the laser beam exiting the device and defines the un-illuminated central portion of the laser beam, and wherein the inverted and reshaped laser beam maintains substantially a maximum power and intensity of the original laser beam.

17. The system of claim 16, wherein the optical device comprises an axicon to invert and reshape the laser beam to provide substantially a minimal lose of power caused by the inverted and reshaped laser beam extending beyond the aperture of the beam director and to provide an optimum intensity at a target on which the inverted and reshaped laser beam is projected.

18. The system of claim 16, wherein the optical device comprises an axicon configured to invert the laser beam and then resize a resultant beam so that a ratio of an outer beam diameter to that of an un-illuminated central portion of the beam is about equal to or slightly greater than that of the aperture of the beam director.

19. The system of claim 16, wherein the optical device comprises:
  a first axicon configured to reshape a substantially square or rectangular laser beam with an illuminated central portion into a substantially circular laser beam; and
  a second axicon configured to substantially remove any illumination in a predetermined central portion of the circular laser beam.

20. The system of claim 16, wherein the optical device comprises:
  a first axicon including:
    a first axicon annular reflector;
    a first axicon substantially cone-shaped reflector to reflect the laser beam to the first axicon annular reflector;
  a second axicon including:
    a second axicon substantially cone-shaped reflector including a central cylindrical opening between a base and an apex of the second axicon cone-shaped reflector; and
    a second axicon annular reflector to reflect the laser beam from the first axicon annular reflector to the second axicon substantially cone-shaped reflector.

21. The system of claim 20, wherein the central cylindrical opening has a predetermined radius geometrically corresponding substantially to a radius of a central obscuration of the aperture of the beam director.

22. The system of claim 16, further comprising an optical element to place the laser beam on the aperture of the beam director to substantially completely fill the aperture of the beam director while leaving only a minimal amount of laser power inside a central obscuration of the aperture of the beam director.

23. The system of claim 22, wherein the optical element comprises a series of steering minors.

24. The system of claim 16, wherein the laser beam includes a substantially square footprint and the optical device comprises an axicon to invert and reshape the laser beam to form a substantially circular laser beam.

25. The system of claim 16, wherein the laser beam comprises a plurality of laser beams in a non-circular array, the system further comprising beam steering means to compact the plurality of beams.

26. The system of claim 16, wherein the laser beam includes a substantially rectangular footprint, the system further comprising a cylindrical telescope disposed before the optical device and wherein the optical device comprises an axicon to invert and reshape the laser beam to form a substantially circular laser beam.

27. A system for reshaping a laser beam, comprising:
  a laser source to generate a substantially square or rectangular laser beam with an illuminated central portion;
  a first axicon configured to reshape the laser beam into a substantially circular laser beam; and
  a second axicon configured to substantially remove any illumination in a predetermined central portion of the circular laser beam; and
  a beam director to project the reshaped laser beam on a target,
  wherein the first axicon comprises:
    a first axicon annular reflector;
    a first axicon substantially cone-shaped reflector to reflect the laser beam to the first axicon annular reflector; and
  wherein the second axicon comprises:
    a second axicon substantially cone-shaped reflector including a central cylindrical opening; and
    a second axicon annular reflector to reflect the laser beam from the first axicon annular reflector to the second axicon substantially cone-shaped reflector.

28. A method for reshaping a laser beam, comprising:
  inverting a substantially square or rectangular laser beam with an illuminated central portion into a substantially circular laser beam; and
  substantially removing any illumination in a predetermined central portion of the circular laser beam, wherein inverting causes an interior portion of the laser beam to become an exterior portion of the laser beam and causes an exterior portion of the laser beam to become an interior portion of the laser beam and to define an un-illuminated central portion of the laser beam, and wherein inverting the laser beam maintains substantially a maximum power and intensity of the original laser beam.

29. The method of claim 28, wherein substantially removing any illumination in the predetermined central portion comprises removing any illumination corresponding to an obscuration of an aperture of a beam director for projecting the laser beam on a target.

30. The method of claim 28, wherein inverting a substantially square or rectangular laser beam comprises inverting and reshaping the laser beam to provide substantially a minimal lose of power caused by the inverted and reshaped laser beam extending beyond an aperture of a beam director and to provide an optimum intensity at a target on which the inverted and reshaped laser beam is projected.

31. A method of making a device for reshaping a laser beam, comprising:
  forming a first axicon configured to reshape a laser beam with an illuminated central portion into a substantially circular laser beam;
  forming a second axicon configured to substantially remove any illumination in a predetermined central portion of the circular laser beam;
  providing a first axicon annular reflector;
  providing a first axicon substantially cone-shaped reflector to reflect the laser beam to the first axicon annular reflector;
  providing a second axicon substantially cone-shaped reflector;
  forming a central cylindrical opening between a base and an apex of the second axicon cone-shaped reflector; and providing a second axicon annular reflector to reflect the laser beam from the first axicon annular reflector to the second axicon substantially cone-shaped reflector.

32. The method of claim 31, wherein forming the central cylindrical opening comprises forming the opening to have a radius corresponding substantially to a radius of a central obscuration of an aperture of a beam director.

* * * * *

UNITED STATES PATENT AND TRADEMARK OFFICE
CERTIFICATE OF CORRECTION

PATENT NO.         : 7,440,190 B2                               Page 1 of 1
APPLICATION NO. : 11/549724
DATED              : October 21, 2008
INVENTOR(S)       : Alan Z. Ullman and Yan S. Tam It is certified that error appears in the above-identified patent and that said Letters Patent is hereby corrected as shown below:

Column 7, line 30, please delete "tan" and insert in place thereof --than--

Column 9, line 9, please delete "lose" and insert in place thereof --loss--

Column 10, line 47, please delete "lose" and insert in place thereof --loss--

Signed and Sealed this

Tenth Day of March, 2009

JOHN DOLL
*Acting Director of the United States Patent and Trademark Office*